United States Patent
Fang et al.

(10) Patent No.: US 12,093,188 B2
(45) Date of Patent: Sep. 17, 2024

(54) PREFETCH-ADAPTIVE INTELLIGENT CACHE REPLACEMENT POLICY FOR HIGH PERFORMANCE

(71) Applicant: BEIJING UNIVERSITY OF TECHNOLOGY, Beijing (CN)

(72) Inventors: Juan Fang, Beijing (CN); Huijing Yang, Beijing (CN); Ziyi Teng, Beijing (CN); Min Cai, Beijing (CN); Xuan Wang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/719,304

(22) Filed: Apr. 12, 2022

(65) Prior Publication Data

US 2022/0374367 A1 Nov. 24, 2022

Related U.S. Application Data

(63) Continuation of application No. PCT/CN2021/119290, filed on Sep. 18, 2021.

(30) Foreign Application Priority Data

May 24, 2021 (CN) .......................... 202110606031.1

(51) Int. Cl.
 *G06F 12/12* (2016.01)
 *G06F 9/30* (2018.01)
 (Continued)

(52) U.S. Cl.
 CPC .......... *G06F 12/12* (2013.01); *G06F 9/30043* (2013.01); *G06F 9/3816* (2013.01); *G06F 9/5044* (2013.01)

(58) Field of Classification Search
 CPC .... G06F 12/12; G06F 9/30043; G06F 9/3816; G06F 9/5044
 (Continued)

(56) References Cited

U.S. PATENT DOCUMENTS

| 6,453,389 B1* | 9/2002 | Weinberger | ......... G06F 12/0862 711/213 |
| 2003/0105939 A1* | 6/2003 | Cooksey | ............. G06F 12/0215 711/E12.004 |

(Continued)

FOREIGN PATENT DOCUMENTS

CN 113297098 A 8/2021

OTHER PUBLICATIONS

NPL Shi et al., "Applying Deep Learning to the Cache Replacement Problem", The 52nd Annual IEEE/ACM International Symposium on Microarchitecture (MICRO-52), Oct. 12-16, 2019. (Year: 2019).*

(Continued)

*Primary Examiner* — David Yi
*Assistant Examiner* — Zubair Ahmed
(74) *Attorney, Agent, or Firm* — J.C. PATENTS

(57) ABSTRACT

The invention discloses a prefetch-adaptive intelligent cache replacement policy for high performance, in the presence of hardware prefetching, a prefetch request and a demand request are distinguished, a prefetch predictor based on an ISVM (Integer Support Vector Machine) is used for carrying out re-reference interval prediction on a cache line of prefetching access loading, and a demand predictor based on an ISVM is utilized to carry out re-reference interval prediction on a cache line of demand access loading. A PC of a current access load instruction and PCs of past load instructions in an access historical record are input, different ISVM predictors are designed for prefetch and demand requests, reuse prediction is performed on a loaded cache (Continued)

line by taking a request type as granularity, the accuracy of cache line reuse prediction in the presence of prefetching is improved, and performance benefits from hardware prefetching and cache replacement is better fused.

3 Claims, 3 Drawing Sheets

(51) Int. Cl.
    *G06F 9/38*     (2018.01)
    *G06F 9/50*     (2006.01)

(58) Field of Classification Search
    USPC .................................................. 711/133, 118
    See application file for complete search history.

(56) References Cited

U.S. PATENT DOCUMENTS

2008/0040554 A1* 2/2008 Zhao .................... G06F 12/126
                                                          711/E12.075
2017/0293571 A1   10/2017  Al Sheikh
2018/0314533 A1   11/2018  Azhen

OTHER PUBLICATIONS

International Search Report of PCT/CN2021/119290.
NPL: "Appling Deep Learning to the Cache Replacement Problem", Micro-52 Oct. 16, 2019 section 1 and section 4.3-4.4.

* cited by examiner

PREFETCH-ADAPTIVE INTELLIGENT CACHE REPLACEMENT POLICY FOR HIGH PERFORMANCE

CROSS-REFERENCE TO RELATED APPLICATIONS

This application is a continuation of the international application No. PCT/CN2021/119290, filed on Sep. 18, 2021, which claims priority to Chinese patent application No. 202110606031.1, filed on May 24, 2021. The contents of the above applications are hereby incorporated by reference in their entireties and form a part of this specification.

TECHNICAL FIELD

The invention belongs to the field of computer system cache structure, and in particular relates to a prefetch-adaptive intelligent cache replacement policy for high performance.

BACKGROUND

As the performance of computer memory is far behind that of processor, a "memory wall" that prevents processor performance from improving is created which makes the performance of the memory system becomes one of the bottlenecks of the whole computer system. The last-level cache (LLC) mitigates the huge gap in latency and bandwidth between the CPU and DRAM, and improving the processor's memory subsystem is important for mitigating the "memory wall" problem.

One approach relies on a well-designed cache replacement policy to efficiently manage on-chip last-level caches by dynamically modifying cache inserts to prioritize data reuse and importance to reduce insert cache lines interference in LLC.

Another mainstream approach to mitigating the "memory wall" problem is to use a hardware prefetcher, which prefetches data into the cache hierarchy before it is actually referenced. Although prefetching can hide memory latency and improve performance significantly, incorrect prefetching can cause cache pollution and can severely degrade processor performance.

As the number of processor cores, workload diversity and complexity increases, replacement policy on CPU processors have evolved from increasingly complex heuristic-based solutions to learning-based solutions. Learning-based cache replacement policy learn data reusability from past cache behavior to predict the priority of future cache line insertions. For example, if a load instruction loaded a cache line that produced a cache hit in the past, it is very likely that the same load instruction will load a cache line that will also produce a cache hit in the future.

The cache replacement policy simulates the optimal replacement decision by predicting the re-reference interval (Re-Reference Prediction Value, RRPV) of the cache line. The reuse interval represents the relative importance of the cache line, and the cache line with a small reuse interval is about to be reused. Inserting the line in the cache with high priority guarantees that the line can remain in the cache.

Cache lines with a large reuse interval are inserted with low priority and are guaranteed to be evicted as soon as possible. In learning-based cache replacement policy, it is common to predict the reuse interval of a cache line based on the Program Counter (PC) of the memory instruction that caused the cache access. If most cache accesses from the same PC have similar reuse behavior, then the reuse interval of the cache line can be accurately predicted based on the PC. For example, SHiP proposes a PC-based reuse prediction algorithm to predict cache reuse behavior and use this prediction to guide cache insertion locations. Hawkeye reconstructs the Belady-MIN algorithm based on past cache accesses, trains a PC-based predictor that learns from the decisions made by the MIN algorithm on past memory accesses, and Hawkeye then makes replacement decisions based on what the predictor has learned.

Zhan et al. modeled cache replacement as a sequence labeling problem, and used a Long Short Term Memory (LSTM) network model to train an offline predictor, which improved the accuracy of prediction due to the input of long-term history of past load instructions.

Furthermore, an online cache replacement policy Glider is proposed, which can compactly represent the program's long-term load instruction history on the hardware, and input it to the online Integer Support Vector Machine (ISVM). The ISVM table is used on the hardware to track the weights of each PC's ISVM. ISVM-based online predictors provide accuracy and performance superior to those used in state-of-the-art cache replacement policy. However, the above research does not consider the existence of prefetchers. In the presence of prefetching, the accuracy of prediction is reduced because prefetch and demand requests are not distinguished. The cache pollution caused by prefetching will also interfere with the management of cache space and reduce memory subsystem performance. From a cache management point of view, prefetch requests have different properties than demand requests, and usually cache lines inserted into the LLC by demand requests are more important to the performance of the program than prefetch requests.

The present invention proposes a prefetch-adaptive intelligent cache replacement policy, which uses the request type as the granularity to predict the reuse of the loaded cache line, inputs PC address of the current fetching load instruction and the past load instructions in the fetching history record, design different ISVM predictors for prefetch and demand requests, improve the accuracy of cache line reuse prediction when prefetcher exists, and better integrate the performance improvement brought by hardware prefetching and cache replacement.

SUMMARY

In order to solve the problem that hardware prefetchers are commonly used in modern high-performance processors, but the performance gain of the latest intelligent cache replacement policy is reduced in the presence of prefetching, the present invention proposes a prefetch-adaptive intelligent cache replacement policy that using request type (demand or prefetch) for granularity to make reuse predictions.

First, select some cache sets in the last-level cache as the sampling sets. The input data of the demand predictor includes the PC address of the load instruction that generates the demand access in the sampling sets, and the past PC addresses stored in the Program Counter History Register (PCHR); the input data of the prefetch predictor including the PC address of the load instruction that triggers the prefetch access in the sampling sets, and the past PC addresses stored in the PCHR; secondly, the component DMINgen is added, and the Demand-MIN algorithm is reconstructed on the hardware to provide labels for the training predictor data. The positive label indicates that the currently accessed cache line is cache-friendly and can be inserted into the cache, and the negative label indicates that the currently accessed cache line is cache-averse and cannot be inserted into the cache. In the training phase of the predictor, the ISVM-based prefetch predictor and the ISVM-based demand predictor are trained separately according to the memory access behavior of the sampling sets with same training methods. Specifically, after the predictor reads the input data, find the weights corresponding to the current input data of PC and PCHR in the ISVM table. If the label corresponding to the input data is a positive label, the weight will increase by 1; otherwise, the weight will decrease by 1.

When using the predictor for prediction, the prediction process of the two predictors is the same. Specifically, the demand predictor or the prefetch predictor is selected for prediction according to the requested type of access. Each ISVM table of the predictor consists of 16 weights, which are used to find the weight values corresponding to different PCs in PCHR, where each ISVM table corresponds to a PC, and the weights in the ISVM table are obtained by training; first, create a 4-bit hash for each PC in PCHR to find the corresponding weights of the PCHR current content, and search the weights in the corresponding ISVM table; these weights are then summed, and if the summation is greater than or equal to the threshold, predict that the currently loaded cache line is cache-friendly and insert it with high priority ; if the summation is less than 0, it is predicted that the line does not meet the cache requirements, and the line is inserted with low priority; for the remaining cases, the line is predicted to be cache-friendly with low confidence, and the line is inserted with medium priority. High-priority inserted lines remain in the cache longer, and low-priority lines are evicted from the cache as soon as possible. The intelligent cache replacement policy adapted to prefetching improves the accuracy of cache line reuse prediction when there is a prefetcher, avoids cache pollution caused by prefetching, and retains more useful data in the cache, thereby improving the performance of the memory subsystem.

The specific technical solutions are as follows:

A prefetch-adaptive intelligent cache replacement policy for high performance, distinguishing prefetch and demand requests, using ISVM-based prefetch predictor to predict re-reference interval for cache lines loaded by prefetch access, using ISVM-based demand predictor to predict re-reference interval for cache lines loaded by demand access. Cache replacement is performed based on the predicted results, each predictor corresponding to a set of ISVM tables, ISVM table A corresponds to a PC address B, and ISVM table A consists of PC addresses B and 16 ISVM weights, of which 16 ISVM weights correspond to the 16 PC addresses that have the most occurrences in PCHR except B, and the initial value of the weight is set to 0.

Training and prediction process of the predictor consists of the following steps: Step 1, select part of the cache sets in the last level cache as the sampling sets, the input data of the demand predictor includes the PC address of the load instruction that generates the demand access, and the past PC addresses stored in the PCHR;

The input data of the prefetch predictor includes PC address of the load instruction that triggers the prefetch access, and the past PC addresses stored in the PCHR;

Step 2, add the component DMINgen, and reconstruct the Demand-MIN algorithm on the hardware to provide training labels for the input data of the training predictor. The labels are divided into positive example labels and negative example labels. The positive example label indicates that the currently accessed cache line is cache-friendly which can be inserted into the cache. The negative label indicates that the currently accessed cache line is not cache-friendly and cannot be inserted into the cache. The specific generation method is as follows:

For the usage interval that ends with the prefetch access P, namely D-P and P-P, DMINgen determines that the currently accessed cache line will not generate a demand hit, and at this time generates a negative label for the PC that accessed the cache line last time; Usage intervals that end P do not increase the number of demand hits, and eviction can provide space for other intervals that generate demand hits, reducing the number of demand misses;

For the usage interval that ends with demand access D, namely P-D and D-D, DMINgen determines that the currently accessed cache line will generate a demand hit. A positive label is generated for the PC that accessed the cache line last time; if the cache space is full at a certain moment in the usage interval, a negative label is generated for the PC that accessed the cache line last time;

The described usage interval refers to the time interval that starts with a reference to X and proceeds up to its next reference X; the usage interval of line X represents the requirement of line X to the cache, and is used to determine whether the reference to line X will cause a cache hit;

Step 3, ISVM-based prefetch predictor and the ISVM-based demand predictor are trained separately according to the memory access behavior of the sampling sets with the same training method, specifically: after the predictor reads the input data, the ISVM table corresponding to the predictor find the weights corresponding to the current input data of PC and in PCHR, if the label corresponding to the input data is positive, the weight will increase by 1; otherwise, the weight will decrease by 1; if the sum of weights corresponding to the current input data PC and PCHR in the ISVM table is greater than the threshold, the weight will not be updated this time.

Step 4, in order to predict the cache line reuse interval with the request type as the granularity, when the predictor is used for prediction, the demand predictor or the prefetch predictor is selected for prediction according to the requested type of access. Each ISVM table of the predictor is composed of 16 weights which are used to find the weight values corresponding to different PCs in PCHR, where each ISVM table corresponds to a PC, and the weights in the ISVM table are obtained by training; first, create a 4-bit hash for each PC in PCHR , which is used to find the weights corresponding to the current contents of the PCHR, and search the weights in the corresponding ISVM table; these weights are then summed, and if the sum is greater than or equal to the threshold, the currently loaded cache line is predicted to be cache friendly, and insert it with high priority; if the sum is less than 0, the line is predicted to not meet the cache requirements, and the line is inserted corresponding to the low priority; for the rest, the line is predicted to be cache-friendly with low confidence, and the line is inserted corresponding to medium priority, the priority represents the reusability and importance of the line, with higher priority lines staying longer in the cache and lower priority lines being evicted earlier.

Using two different predictors to separate the prediction of demand and prefetch requests provides a better understanding of the cache behavior of load instructions that lead to demand and prefetch accesses. For example, a load instruction that loads a cache-friendly demand access, but triggers an incorrect prefetch will be classified as cache-friendly by the demand predictor and as cache- averse by the prefetch predictor.

Step 5: When replacing the cache line, the cache line with low priority will be selected as the eviction candidate; if there is no such line, the earliest line entering the cache will be selected from the cache-friendly lines for eviction.

Differentiating between prefetch and demand requests improves the accuracy of reuse interval prediction, which can reserve more useful cache lines and avoid cache pollution caused by prefetching, improving the performance of the memory subsystem.

Compared with the prior art, the present invention has the following advantages: Hardware prefetchers improve performance by fetching useful data in advance, but there will be interference between cache prefetching and replacement policy. Cache pollution caused by prefetching will reduce processor performance. Replacement policy deal with prefetch and demand requests equally which reduces the performance gain of the replacement algorithm. Considering the different nature of prefetch and demand requests, the intelligent cache replacement policy adapted to prefetching trains different predictors for demand and prefetch requests, inputs the current PC and the PC sequence of past load instructions in the fetch history, predicts the priority of cache line insertion for demand and prefetch accesses. Intelligent cache replacement policy adapted to prefetching can reduce the interference of prefetch on replacement policy, improve the accuracy of reuse interval prediction, retain useful cache lines and avoid cache pollution caused by prefetching, have better integrate hardware prefetching and cache replacement performance.

EMBODIMENTS

In order to make the objectives, technical solutions and advantages of the present invention clearer, the embodiments of the present invention will be described in detail below with reference to the accompanying drawings.

Figure 1:
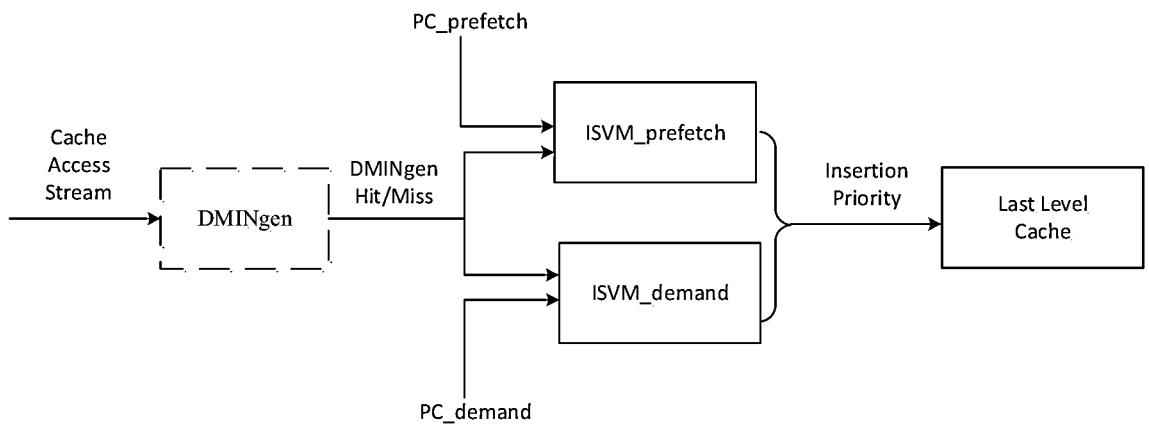
FIG. 1 is a framework diagram of a prefetch-adaptive intelligent cache replacement policy.

The present invention relates to a prefetch-adaptive intelligent cache replacement policy, as shown in FIG. 1, its main components are a demand request predictor and a prefetch request predictor for predicting reuse intervals, and a DMINgen for simulating Demand-MIN algorithm to provide the input labels of the training predictor. The design mainly includes two parts: training and prediction of demand predictor and prefetch predictor. Input data of the demand predictor includes PC address of the load instruction that generated the demand access, and the past PC addresses stored in the PCHR; Input data of the prefetch predictor includes the PC address of the load instruction that triggered the prefetch access, and the past PC addresses stored in the PCHR; DMINgen simulates the Demand-MIN algorithm to provide training labels for the input data of the training predictor. Two kinds of predictors are trained based on the cache access behavior of the sampled sets. In each cache access, the ISVM-based prefetch predictor is used to predict the re-reference interval of the cache line loaded by the prefetch access, and the ISVM-based demand predictor is used to predict the re-reference interval of the cache line loaded by the demand access. The accuracy of cache line reuse interval prediction is improved by distinguishing reuse predictions for prefetch and demand requests.

Specific steps are as follows:

Step 1, a PC history register (PC History Register, PCHR) is added to the hardware, which is used to save the PC history record of the past load instructions during the program running. A longer PC record can improve the accuracy of prediction.

Select some cache sets in last-level cache as the sampling sets. Input data of the demand predictor includes the PC address of the load instruction that generates the demand access, and the past PC addresses stored in PCHR; Input data of the prefetch predictor includes PC address that triggers prefetching of the accessed load instruction, and the past PC addresses stored in PCHR.

Figure 2:
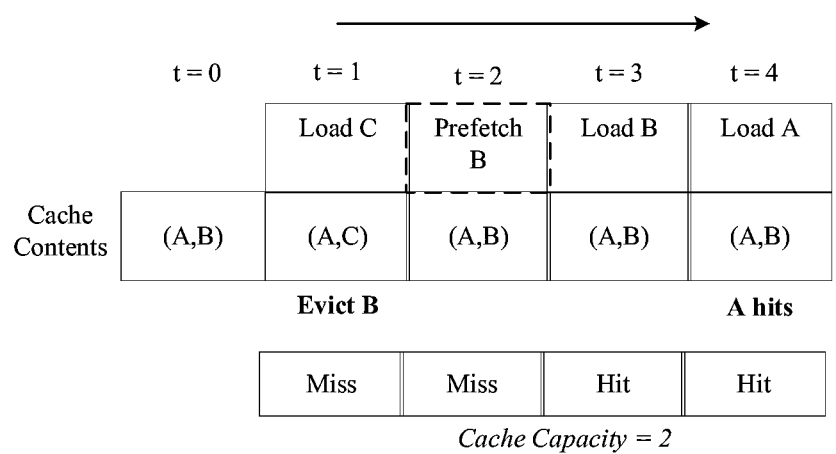
FIG. 2 is a schematic diagram of how the Demand-MIN algorithm reduces the number of demand misses.

Step 2, DMINgen provides training labels for the input data to train the predictor. DMINgen extends the concept of usage interval defined in Hawkeye, and the endpoints for fine-grained identification of usage intervals are demand access (D) or prefetch access (P). The usage intervals after distinguishing request types include D-D, P-D, P-P, and D-P; For the usage interval that ends with the prefetch access P, that is, D-P and P-P, DMINgen determines that the currently accessed cache line will not generate a demand hit, and at this time generates a negative label for the PC that accessed the cache line last time; DMINgen evict cache line like this which does not produce a demand hit;

For the usage interval that ends with demand access D, namely P-D and D-D, DMINgen determines that the currently accessed cache line will generate a demand hit. A positive label is generated for the PC that accessed the cache line last time; if the cache space is full at a certain moment in the usage interval, a negative label is generated for the PC that accessed the cache line last time;

FIG. 2 shows a memory access sequence, in which the dashed box is a prefetch access, and the non-dotted box is a demand access.

For a cache that can hold 2 cache lines and initially hold A and B, when line C is loaded into the full cache, eviction of A or B will result in a different number of demand misses. Looking at the memory access sequence in the figure, at time t=1, DMINgen chooses to evict B, since B will be prefetched at time t=2, the demand access to B hits at t=3, and then the demand access to A hits at t=4. DMINgen evicts the farthest prefetched B in the current memory access sequence, and at the same time generates a negative label for the PC that accessed B last time. Compared with expelling the farthest reused A in the current memory access sequence at t=1, DMINgen reduces the number of demand misses at a time, which can improve the performance of the program.

Step 3: Part of the cache sets in the last-level cache is used as sampling sets, and two different predictors are used to separate the training of the demand and the prefetch request according to the type of accessed request.

The ISVM-based prefetch predictor and the ISVM-based demand predictor are trained separately according to the memory access behavior of the sampling sets with same training methods. Specifically, after reading the input data, the predictor searches for the weight corresponding to the current input data of PC and PCHR in the ISVM table. If the label corresponding to the input data is a positive example label, the weight will increase by 1, otherwise, the weight will decrease by 1; if the sum of the weights corresponding to the current input data of PC and PCHR in the ISVM table is greater than the threshold, the weights will not be updated this time. Not update the weights after it is exceeded can prevent the weights from being fully saturated to their extreme values. Therefore, the predictor can respond quickly to changes in the running behavior of the program to improve the prediction accuracy. The thresholds in this example are dynamically chosen from a fixed set of thresholds (0, 30, 100, 300, and 3000).

Figure 3:
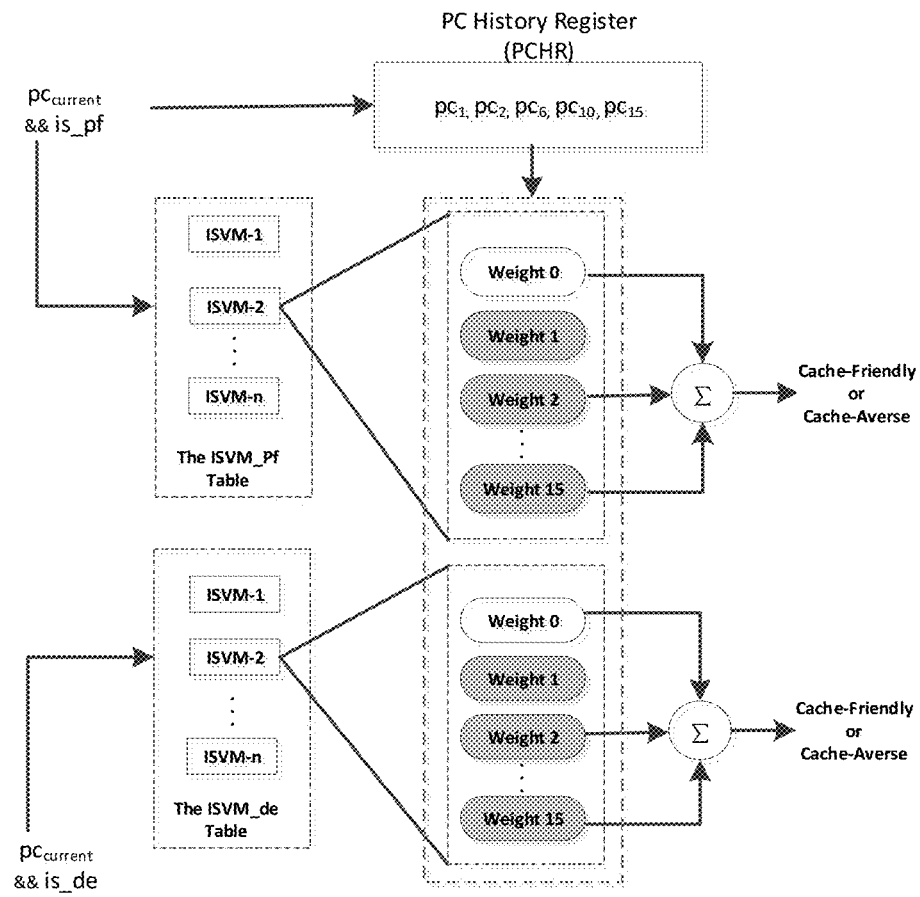
FIG. 3 is a schematic diagram of the demand predictor and prefetch predictor based on ISVM.

Step 4, in order to predict the cache line reuse interval at the granularity of a request type, as shown in FIG. 3, the prediction process of the two predictors is the same, which specifically includes the following steps:

The demand predictor or the prefetch predictor is selected for prediction according to the requested type of access. Each ISVM table of the predictor is composed of 16 weights, which are used to find the weight values corresponding to different PCs in the PCHR, where each ISVM table corresponds to a PC, the weights in the ISVM table are obtained by training; first, a 4-bit hash is created for each PC in the PCHR, and the 16 numbers represented by the 4-bit hash correspond to the 16 weights in the ISVM table. The weights can then be searched in the corresponding ISVM table; these weights are then summed, and if the sum is greater than or equal to the threshold, predict that the currently loaded cache line is cache-friendly and insert it with high priority; if the sum is less than 0, it is predicted that the line does not meet the cache requirements, and the line is inserted with low priority; for the rest, it is predicted that the line is cache-friendly with low confidence, and it is inserted with medium priority;

For example, in FIG. 3, PCHR contains $PC_1$, $PC_2$, $PC_6$, $PC_{10}$ and $PC_{15}$. Combined with the current PC and memory access request type that generated this access, we search the corresponding ISVM table for the weight values corresponding to different PCs in PCHR, i.e. weight1, weight2, weight6, weight10, weight15, sum these weights, if the sum is greater than or equal to the threshold, we predict that the currently accessed cache line is cache-friendly and insert it with high priority (RRPV=0); if the sum is less than 0, we predict that the line is cache-averse and insert it with low priority (RRPV=7); for the rest, we determine that the line is cache-friendly with low confidence and insert it with medium priority level (RRPV=2). In this embodiment, the threshold value is 60. The priority of cache line insertion represents the reusability and importance of the line. High-priority lines reside in the cache longer, and low-priority lines are evicted earlier, thereby retaining more useful cache lines in cache.

Step 5: When replacing the cache line, the line inserted with low priority (RRPV=7) will be selected as the eviction candidate. If there is no such line, the earliest line into the cache will be selected from the cache-friendly lines.

Due to the different properties of prefetch requests and demand requests, designing different predictors can improve the accuracy of cache line reuse prediction and make more accurate decisions during cache line insertion and eviction, keeps more useful cache lines in cache and avoids cache pollution caused by prefetching, have better integrates benefits of hardware prefetching and replacement policies.

Figure 4:
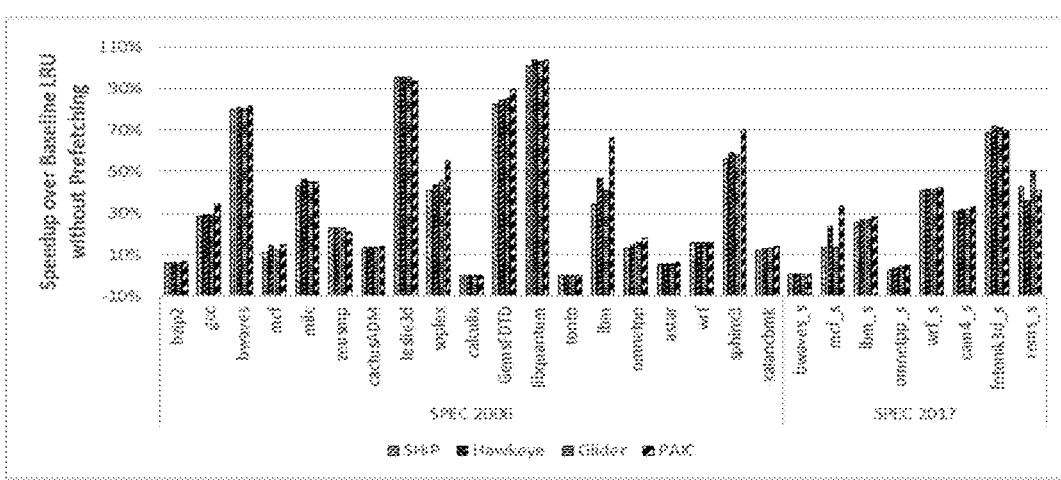
FIG. 4 shows the IPC comparison diagram between the prefetch-adaptive cache replacement policy and other state-of-the-art replacement algorithms.
Figure 5:
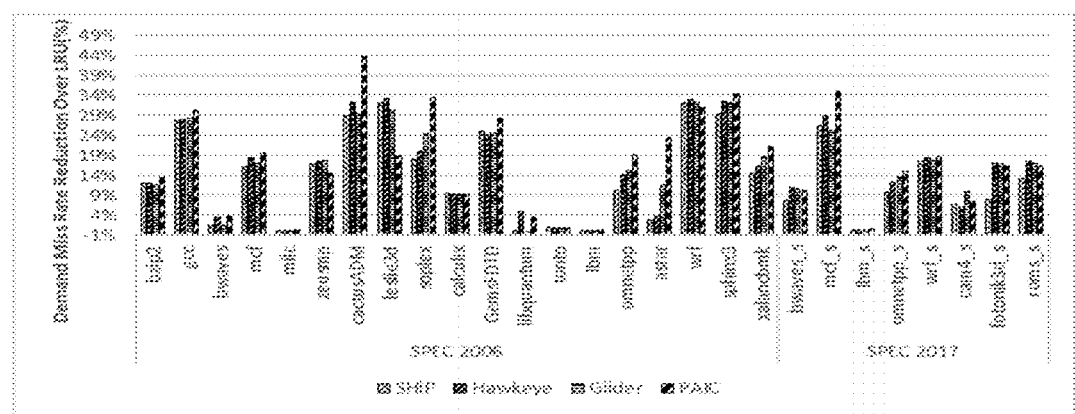
FIG. 5 shows the LLC demand access miss rate comparison diagram between the prefetch-adaptive cache replacement policy and other state-of-the-art replacement algorithms.

In this invention, cache prefetching and cache replacement are two independent technologies of cache management, and the interaction between them will cause performance differences of application programs. Although prefetching can hide memory latency and improve performance, harmful prefetching can cause cache pollution, and a cache replacement policy that cannot accommodate prefetching can cause performance differences or even degradation. Therefore, we propose a new prefetch-adaptive intelligent cache replacement policy, distinguish between prefetch and demand requests, design different ISVM-based predictors for two different types of requests, and apply machine learning to prefetch-enabled cache management, which improves the accuracy of reuse interval prediction and reduces the interference of cache prefetching on replacement policy. The intelligent replacement policy that supports prefetching can better integrate the performance advantages brought by hardware prefetching and cache replacement. This Cache management policy uses the simulation framework released by the 2nd JILP Cache Replacement Championship (CRC2) to evaluate the model. The framework is based on ChampSim, and relevant data are obtained through experiments. FIG. 4 is a comparison diagram of the weighted speedup normalized to LRU of the prefetch-adaptive intelligent cache replacement policy (PAIC) and other state-of-the-art replacement policies, and FIG. 5 is a comparison diagram of the LLC demand miss rate between the prefetch-adaptive intelligent cache replacement policy and other state-of-the-art replacement policies, both of the FIGS. 4 and 5 are evaluated on memory-intensive SPEC2006 and SPEC2017 benchmark suites. Through calculation, when the prefetcher exists in the single-core configuration, the prefetch-adaptive intelligent cache replacement policy is improved by 37.22% compared with the baseline LRU (LRU without prefetching), the improvement of SHiP is 32.93%, and the improvement of Hawkeye is 34.56%, and Glider's boost is 34.43%. FIG. 5 shows that the prefetch-adaptive intelligent cache replacement policy reduces the average demand miss rate by 17.41% relative to the baseline LRU, while the demand miss rate of SHiP, Hawkeye, and Glider reduce by 13.66%, 15.46%, and 15.48%, respectively. The prefetch-adaptive intelligent cache replacement policy effectively combines the performance advantages brought by hardware prefetching and cache replacement, ensuring that in the presence of hardware prefetching, the performance benefits brought by the intelligent cache replacement policy improves system performance.

We claim:

1. A prefetch-adaptive intelligent cache replacement policy for high performance comprising:

distinguishing prefetch and demand requests, using an ISVM-based prefetch predictor to predict re-reference interval for cache lines loaded by prefetch access, using an ISVM-based demand predictor to predict re-reference interval for cache lines loaded by demand access;

wherein cache replacement is performed based on predicted results, each predictor corresponding to a set of ISVM tables, ISVM table A corresponds to a PC address B, and ISVM table A consists of PC addresses B and 16 ISVM weights, of which the 16 ISVM weights correspond to 16 PC addresses that have the most occurrences in PCHR except B, and an initial value of the weight is set to 0;

wherein training process of the two predictors is the same, including the following steps:

preparation of training data:

step 1. select part of cache sets in a last level cache as sampling sets, input data of the demand predictor includes a PC address of a load instruction that generates a demand access. and past PCs stored in PCHR;

the input data of the prefetch predictor includes PC address of the load instruction that triggers the prefetch access, and past PCs stored in the PCHR;

PCHR added on the hardware is used to save the past load instructions in the process of running PC history record;

step 2, add a component DMINgen, and reconstruct Demand-MIN algorithm on the hardware to provide training labels for the input data of a training predictor; the training labels are divided into positive example labels and negative example labels; the positive example label indicates that a currently accessed cache line is cache-friendly which can be inserted into the cache; the negative label indicates that the currently accessed cache line is cache-averse and cannot be inserted into the cache; the specific generation method is as follows:

for a usage interval that ends with the prefetch access P, namely D-P and P-P. DMINgen determines that the currently accessed cache line will not generate a demand hit, and at this time generates a negative label for a PC that accessed the cache line last time;

for the usage interval that ends with demand access D, namely P-D and D-D, DMINgen determines that the currently accessed cache line will generate a demand hit; a positive label is generated for the PC that accessed the cache line last time; if the cache space is full at a certain moment in the usage interval, a negative label is generated for the PC that accessed the cache line last time;

the described usage interval refers to a time interval that starts with a reference to X and proceeds up to its next reference X; the usage interval of line X represents a requirement of line X to the cache, and is used to determine whether the reference to line X will cause a cache hit;

predictor training:

ISVM-based prefetch predictor and the ISVM-based demand predictor are trained separately according to the memory access behavior of the sampled cache sets with the same training method, specifically: after the predictor reads the input data, the ISVM table corresponding to the predictor find the weights corresponding to the current input data of PC and in PCHR, if the label corresponding to the input data is positive, the weight will increase by 1; otherwise, the weight will decrease by 1; if a sum of weights corresponding to the current input data PC and PCHR in the ISVM table is greater than a threshold, the weight will not be updated this time.

2. The prefetch-adaptive intelligent cache replacement policy for high performance according to claim 1, wherein prediction process of the two predictors is the same, including the following steps:

the demand predictor or the prefetch predictor is selected for prediction according to the requested type of access; first, create a 4-bit hash for each PC in PCHR, which is used to find the weights corresponding to the current contents of the PCHR, and search the weights in the corresponding ISVM table; these weights are then summed, and if the summation is greater than or equal to the threshold, a currently loaded cache line is predicted to be cache friendly, and insert it with high priority; if the summation is less than 0, a line is predicted to not meet a cache requirement, and the line is inserted corresponding to a low priority; for the rest, the line is predicted to be cache-friendly with a low confidence, and the line is inserted corresponding to medium priority, the priority represents the reusability and importance of the line, with higher priority lines staying longer in the cache and lower priority lines being evicted earlier.

3. The prefetch-adaptive intelligent cache replacement policy for high performance according to claim 1, wherein the cache replacement methods are as follows:

when replacing a cache line, the cache line with low priority will be selected as an eviction candidate; if there is no such line, an earliest line entering the cache will be selected from the cache-friendly lines for eviction.

* * * * *